US011274048B2

(12) United States Patent
Maughan (10) Patent No.: US 11,274,048 B2
(45) Date of Patent: Mar. 15, 2022

(54) PORTABLE WATER FILTRATION APPARATUS

(71) Applicant: Robert Maughan, St. George, UT (US)

(72) Inventor: Robert Maughan, St. George, UT (US)

( * ) Notice: Subject to any disclaimer, the term of this patent is extended or adjusted under 35 U.S.C. 154(b) by 0 days.

(21) Appl. No.: 17/100,391

(22) Filed: Nov. 20, 2020

(65) Prior Publication Data

US 2021/0155502 A1     May 27, 2021

Related U.S. Application Data

(60) Provisional application No. 62/940,305, filed on Nov. 26, 2019.

(51) Int. Cl.
| | | |
|---|---|---|
| *C02F 1/00* | (2006.01) | |
| *F04D 13/06* | (2006.01) | |
| *C02F 9/00* | (2006.01) | |
| *B01D 35/26* | (2006.01) | |
| *F04D 13/08* | (2006.01) | |

(52) U.S. Cl.
CPC .............. *C02F 1/002* (2013.01); *B01D 35/26* (2013.01); *C02F 9/005* (2013.01); *F04D 13/068* (2013.01); *C02F 2201/002* (2013.01); *C02F 2201/008* (2013.01); *C02F 2201/009* (2013.01); *C02F 2307/04* (2013.01); *F04D 13/08* (2013.01)

(58) Field of Classification Search
CPC ...... C02F 1/002; C02F 2307/04; C02F 9/005; C02F 2201/009; C02F 2201/008; C02F 2201/002; F04D 13/068; F04D 13/08; B01D 35/26
USPC .............................. 210/249, 250, 258, 416.3
See application file for complete search history.

(56) References Cited

U.S. PATENT DOCUMENTS

| | | | | | |
|---|---|---|---|---|---|
| 3,498,457 | A | * | 3/1970 | Gough .................... | C02F 1/325 210/85 |
| 5,824,215 | A | * | 10/1998 | Suh ......................... | C02F 9/005 210/249 |
| 6,139,741 | A | * | 10/2000 | McGibbon ........... | B01D 35/303 137/545 |

FOREIGN PATENT DOCUMENTS

WO     WO-2015106233 A1 *  7/2015  .............. C02F 1/001

* cited by examiner

*Primary Examiner* — Matthew O Savage
(74) *Attorney, Agent, or Firm* — Gurr Brande & Spendlove, PLLC; Robert A. Gurr (57) ABSTRACT

A portable water filtration apparatus has a top panel, a mounting surface, an electric pump mounted to the mounting surface, at least one filter, and at least one filter housing coupled to the top panel, with the at least one filter filtering water from the pump. The portable filtration apparatus has a housing, such as a bucket, to fully contain the components and which may be used for collecting either filtered or unfiltered water.

11 Claims, 12 Drawing Sheets

PORTABLE WATER FILTRATION APPARATUS

CROSS-REFERENCE TO RELATED APPLICATIONS

This application claims the benefit of U.S. Provisional Application Ser. No. 62/940,305, filed on Nov. 26, 2019, which is incorporated herein by reference.

TECHNICAL FIELD

The present disclosure is directed toward water filtration systems. More particularly, the present disclosure is directed toward a portable battery- or solar-powered water filtration apparatus.

BACKGROUND

Potable water is an essential part of life. As such, there is a constant need to find ways to supply potable water. As a result, there are numerous systems and methods for filtering water to make it potable. Many systems are large-scale and are used by municipalities to provide potable water to its citizens. However, natural disasters are a constant reminder that municipal systems can be easily compromised, making it difficult for affected areas to maintain potable water.

Due to this concern, many people store water, assuming it will remain accessible and uncompromised during/after a natural disaster. However, the water stores may not be sufficient, depending upon the number of people needing water and the length of non-service by the municipality. Further, the water stores may likewise be compromised, leaving a user with little to no potable water.

Accordingly, there are several portable water filtration systems in the art. These systems are designed to allow a user to filter any number of water sources, creating potable water. These systems are beneficial as they do not require a user to store large amounts of water. Further, in the event the water stores are compromised, the user may still drink the water after using a portable filtration system. However, despite these filtration systems, there are still several problems that remain unsolved. For example, many systems are expensive, have proprietary parts or filters, require grid-supplied electricity, are large and bulky, have limited processing capacity, or other drawbacks.

Therefore, there remains a need for a portable water filtration system that is inexpensive, has high through-put, is effective, compact, that uses readily accessible filters and accessories, and that can be powered by batteries or solar power. The present invention seeks to solve these and other problems.

SUMMARY OF EXAMPLE EMBODIMENTS

In one embodiment, a portable filtration apparatus comprises a base, a hinged top, and a mounting surface interposed therebetween; a pump mounted to the mounting surface; and at least one filter and filter housing coupled to the hinged top, with the at least one filter filtering water from the pump. In one embodiment, the portable filtration apparatus further comprises a housing (e.g., a bucket).

In one embodiment, the pump is battery operated. In one embodiment, the portable filtration apparatus further comprises at least one solar panel.

In one embodiment, a portable filtration apparatus comprises a top panel, a mounting surface, a pump mounted to the mounting surface, one or more filters, and one or more filter housings coupled to the top panel, with the one or more filters filtering water from the pump. In one embodiment, the portable filtration apparatus further comprises a housing (e.g., a bucket).

DETAILED DESCRIPTION OF EXAMPLE EMBODIMENTS

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a portable water filtration system that is inexpensive, effective, compact, that uses readily accessible filters and accessories, and that can be powered by batteries or solar power. The portable water filtration apparatus described below solves these, and other, problems.

Having potable water during a natural disaster is essential to sustaining life. Many people store water, which may be compromised during a natural disaster and/or may not last as long as needed depending on the number of people needing water. To combat this issue, portable water filtration systems were created. However, many of these systems are expensive, have proprietary parts or filters, require grid-supplied electricity, are large and bulky, have limited processing capacity, require significant human effort to mechanically pump the water, have slow throughput, or other drawbacks. Accordingly, the portable filtration apparatus disclosed herein solves these problems and others.

The portable filtration apparatus generally comprises a pump and filter housings that accept any standard filter. The pump does not require grid supply, although that may be an option. The pump operates via a battery and/or solar power, allowing it to function during a natural disaster. As the pump is turned on, water may flow through the pump from a water source and then to the filter housing with the filters therein. When the water exits the filter housings, it is potable and ready to be used. Further, the portable filtration apparatus is compact and easily fits in a housing, such as a 5-gallon bucket. This makes the apparatus easy to store as well as transportable during a time of need. Further, the housing may double as a water storage container.

In one embodiment, as shown in FIGS. 1-9, a portable filtration apparatus 100 comprises a base 102, a hinged top 104, and a mounting surface 106 interposed therebetween. A pump 108 is mounted to the mounting surface 106 on a first, outer side. Further, at least one filter portion 110, 112 is coupled to the hinged top 104, such as by using screws 114, bolts, or other fastening means. As shown, the pump 108 has an inlet 116 and an outlet 118 leading to a filter coupler 120 of the filter portion 110, 112. For example, the pump inlet 116 may comprise a hose or tube that can be placed within a water source. As the pump 108 is activated, water passes through outlet 118 to the inlet end of filter coupler 120, is then filtered through the one or more filter portions 110, 112, and then exits as potable water through coupler outlet 122.

In one embodiment, filter portions 110, 112 comprise standard cartridge filters readily available in the art, and are easily couplable to the filter coupler 120, such as by using a threaded filter housing 124. This allows a user to have filters readily available for use without needing proprietary filters or other components. Another advantage is that these commercially available filters can be tailored to the specific contaminant needing removal (i.e., sediment, Volatile Organic Compounds (VOCs), biologics (bacteria, cysts), inorganics (chlorine, heavy metals), and/or dissolved solids such as calcium or magnesium.

In order to replace the filters in filter portions 110, 112, the hinged top 104 is pivoted on the hinge 126 (or other mechanism), which tilts the filter portion 110, 112, allowing the housings 124 to be decoupled and removed from the filter coupler 120. A user may then remove and replace the cartridge filter within the housing 124 and then re-couple (such as by using threaded ends) to the filter coupler 120. To prevent unwanted pivoting/tilting of the hinged top 104, the hinged top 104 may be secured to the base 102 using a securing rod 128 and cotter pin 130 (or similar locking mechanism). Accordingly, the user would remove the cotter pin 130, releasing the securing rod 128 from the hinged top 104, allowing a user to tilt the hinged top 104 backward and remove and replace the filters of filter portion 110, 112. The hinged top 104 may further comprise a handle 132 for convenience of the user in transporting.

Figure 1:
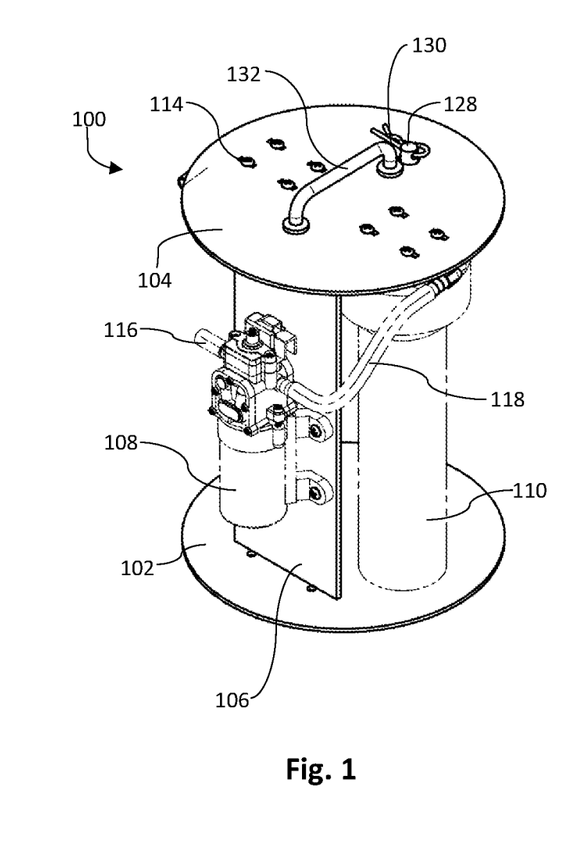
FIG. 1 illustrates a top, side perspective view of a portable water filtration apparatus.
Figure 2:
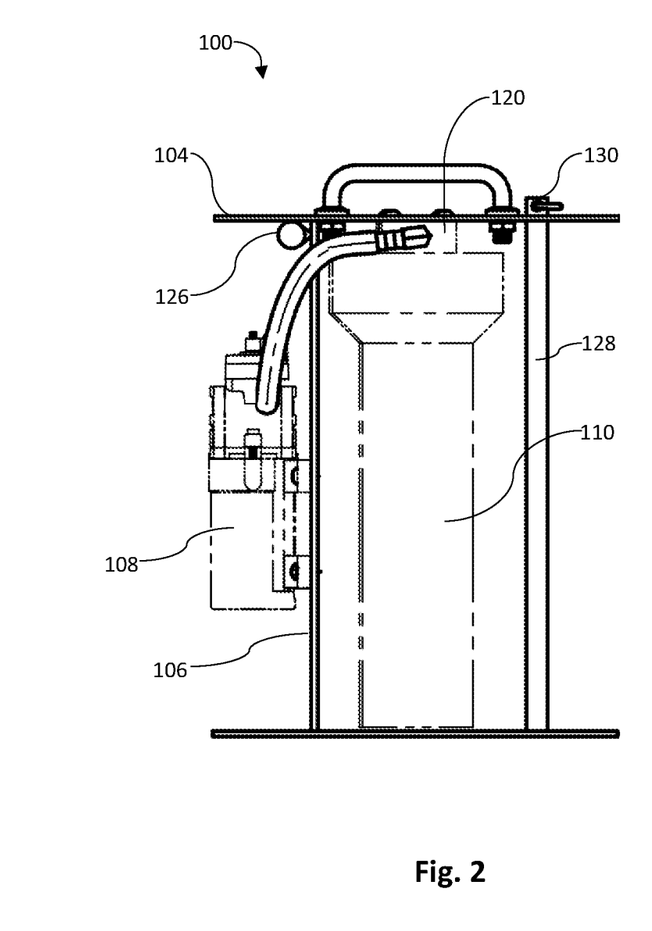
FIG. 2 illustrates a right side elevation view of a portable water filtration apparatus.
Figure 3:
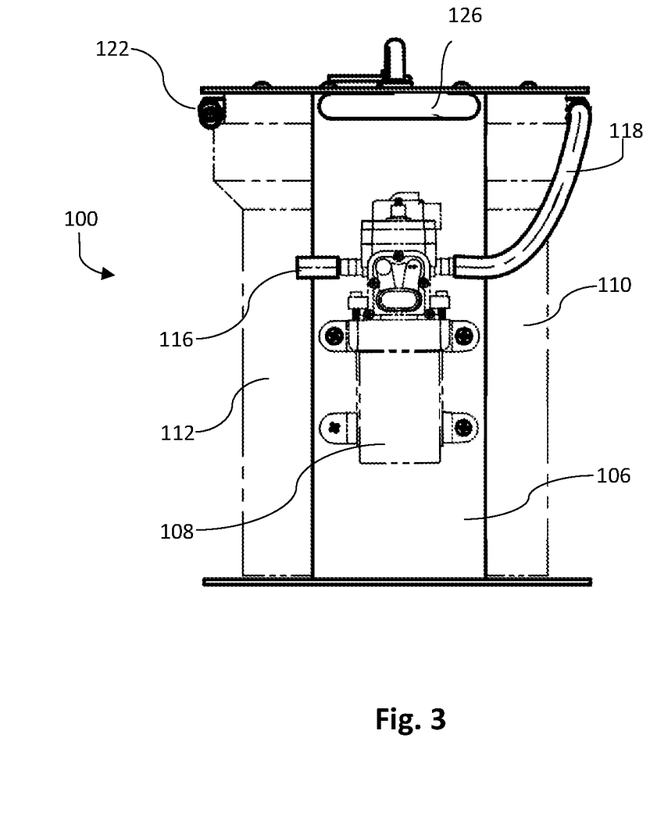
FIG. 3 illustrates a rear elevation view of a portable water filtration apparatus.
Figure 4:
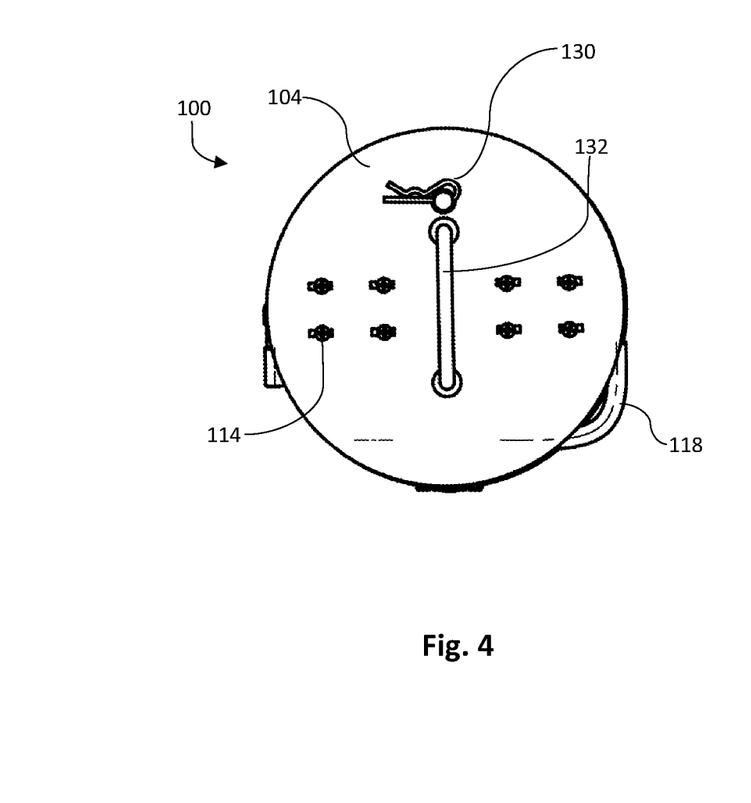
FIG. 4 illustrates a top plan view of a portable water filtration apparatus.
Figure 5:
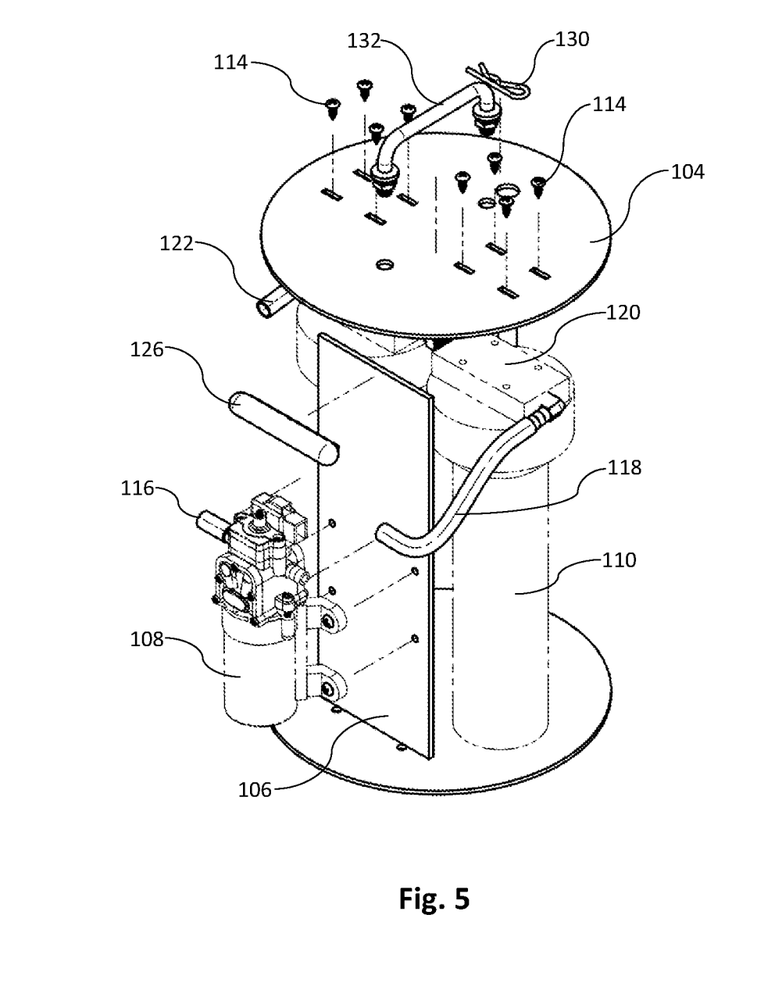
FIG. 5 illustrates an exploded view of a portable water filtration apparatus.
Figure 6:
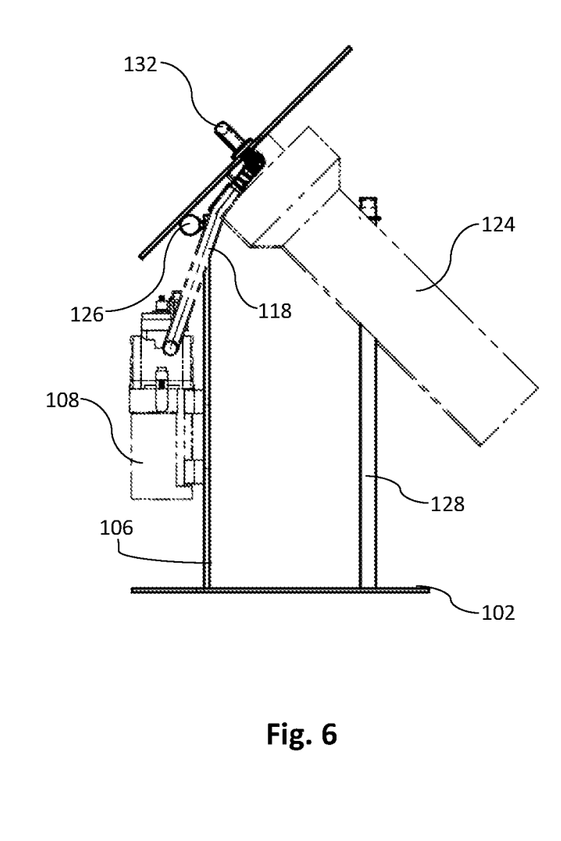
FIG. 6 illustrates a side elevation view of a portable water filtration apparatus in a tilted position.
Figure 7:
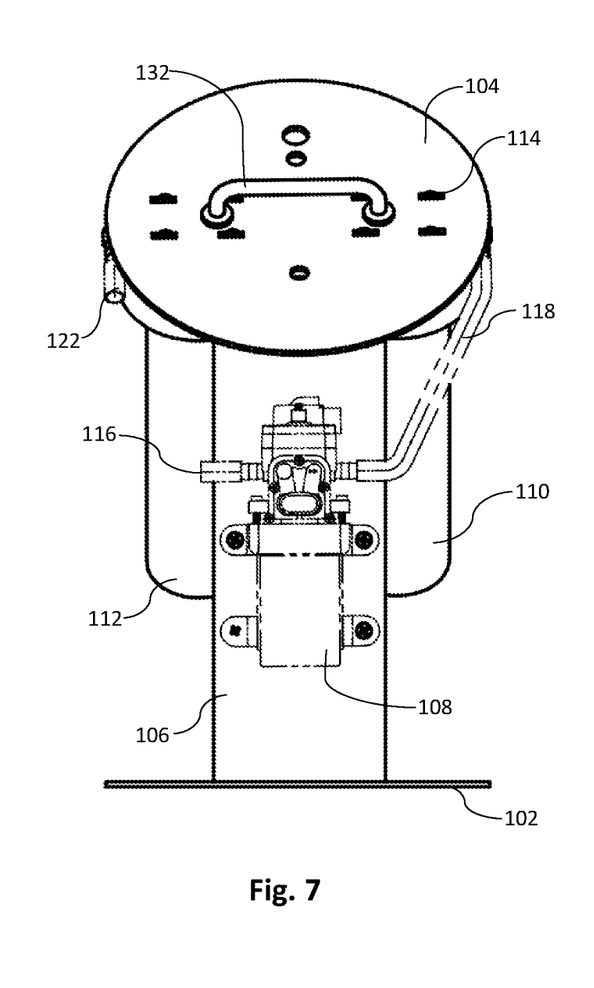
FIG. 7 illustrates a rear elevation view of a portable water filtration apparatus in a tilted position.
Figure 8:
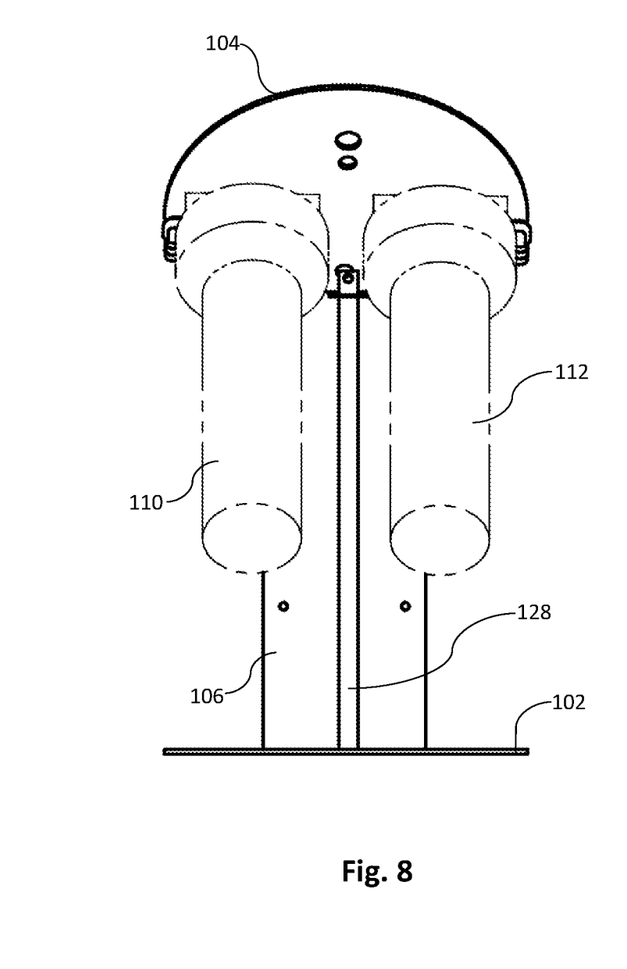
FIG. 8 illustrates a front elevation view of a portable water filtration apparatus in a tilted position.
Figure 9:
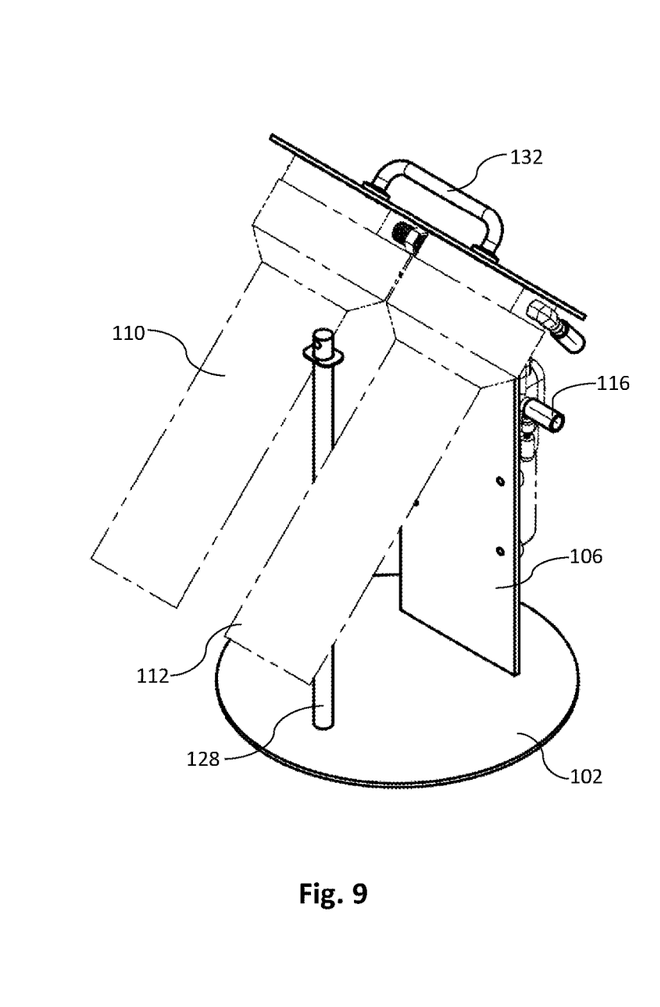
FIG. 9 illustrates a front perspective view of a portable water filtration apparatus in a tilted position.
Figure 10:
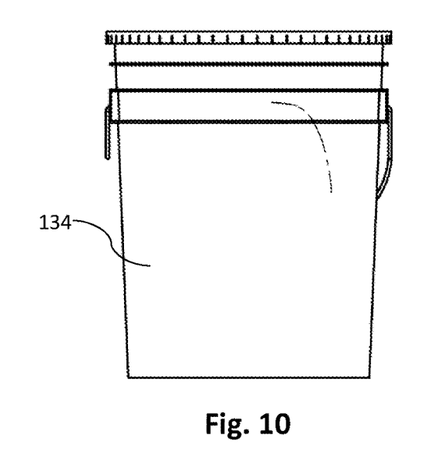
FIG. 10 is a rear elevation view of a housing of a portable water filtration apparatus.
Figure 11:
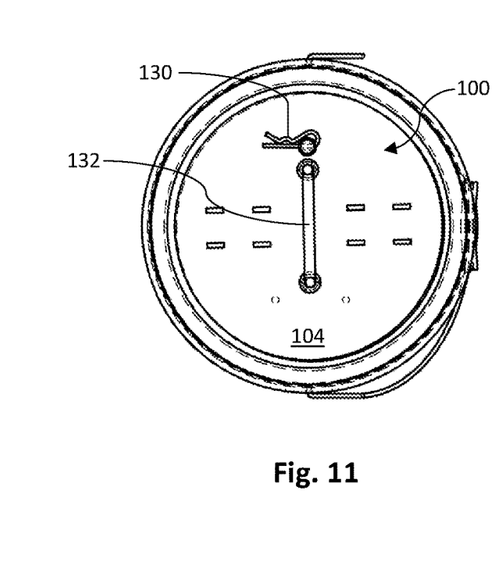
FIG. 11 is a top plan view of a portable water filtration apparatus in a housing.
Figure 12:
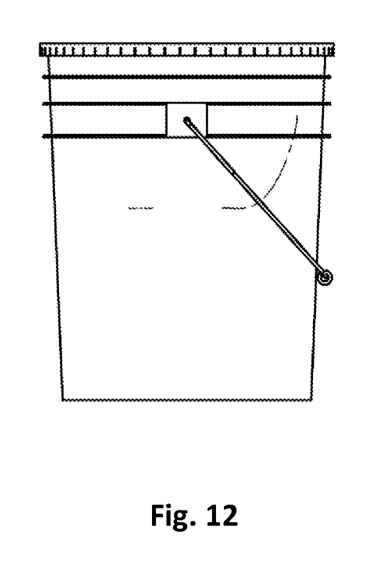
FIG. 12 is a side elevation view of a portable water filtration apparatus.
Figure 13:
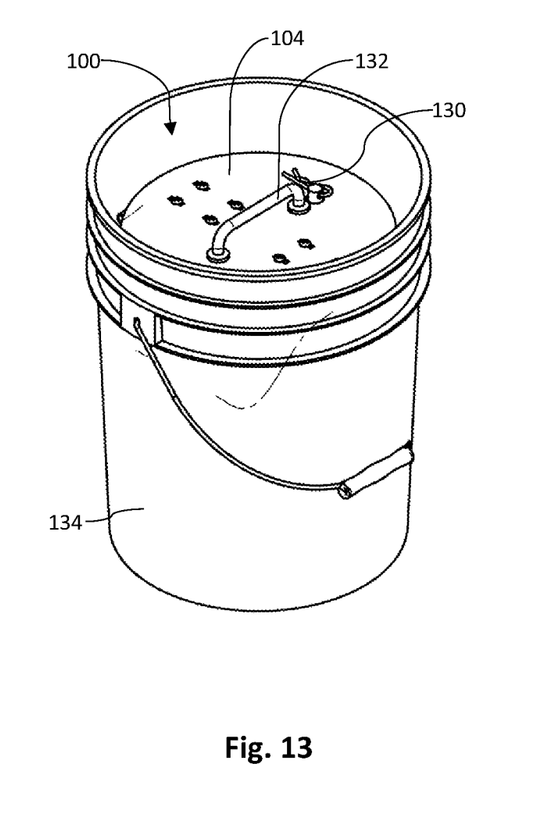
FIG. 13 is a top perspective view of a portable water filtration apparatus in a housing.
Figure 14:
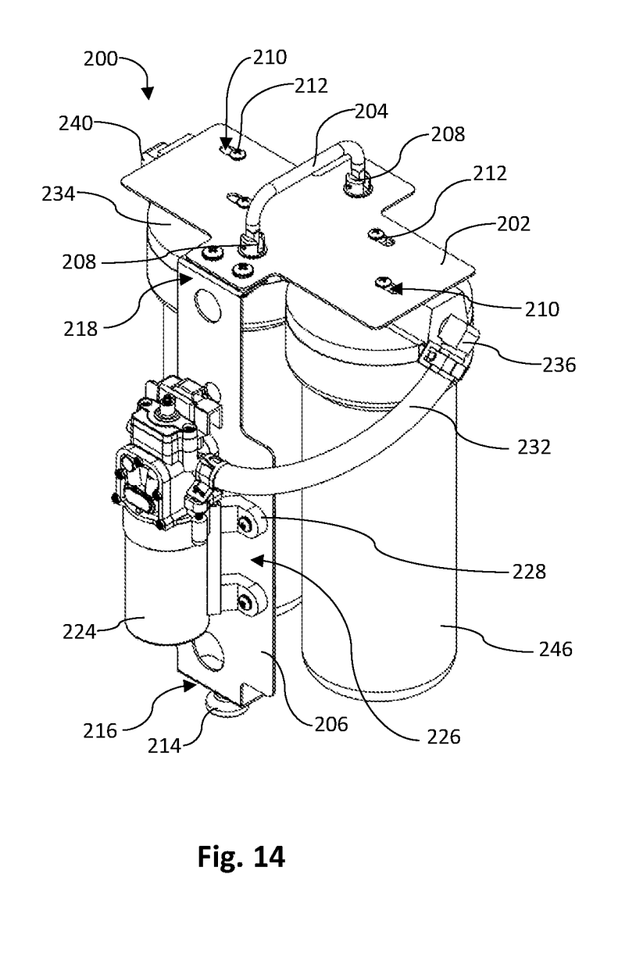
FIG. 14 is side perspective view of a portable water filtration apparatus.
Figure 15:
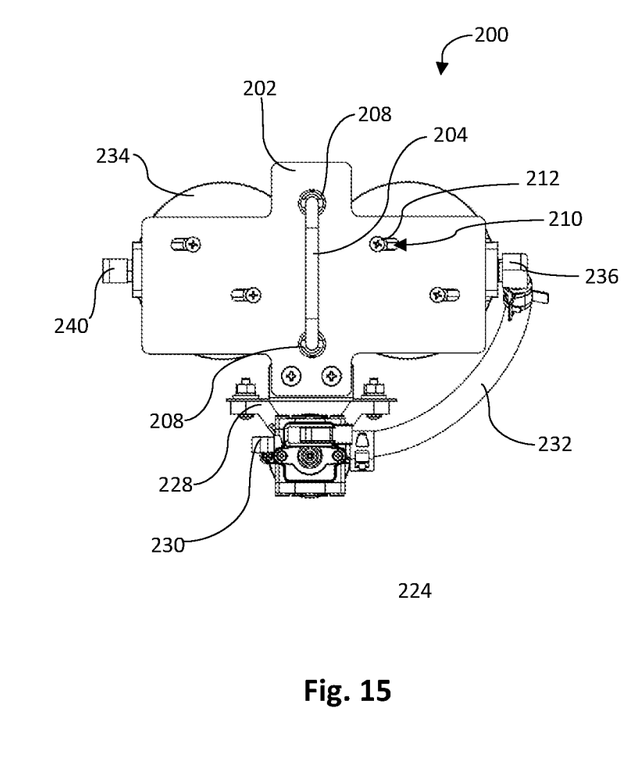
FIG. 15 is a top plan view of a portable water filtration apparatus.
Figure 16:
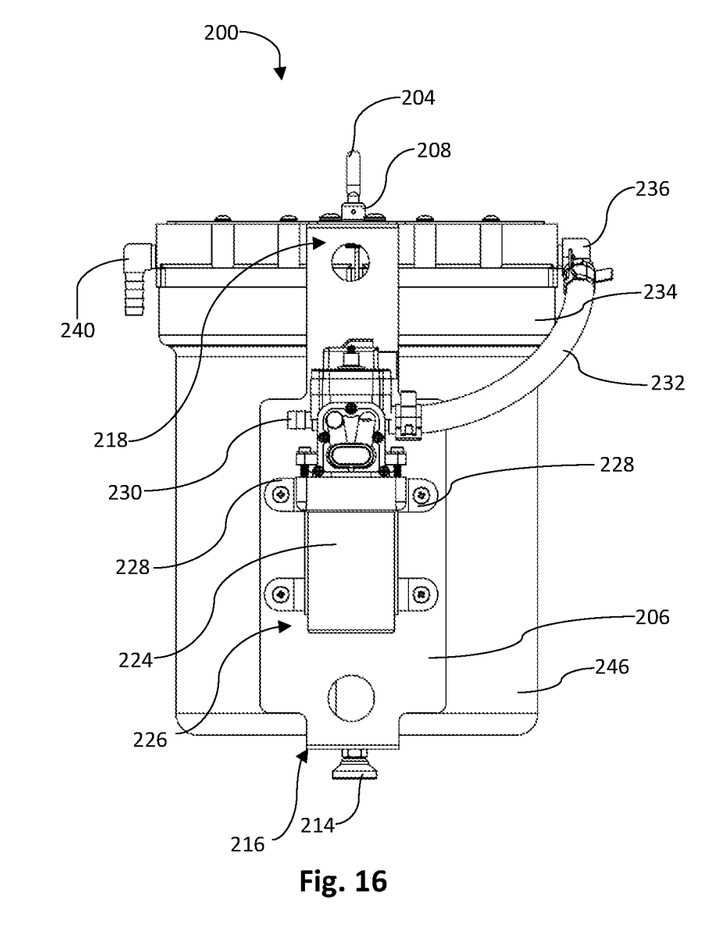
FIG. 16 is a rear elevation view of a portable water filtration apparatus.
Figure 17:
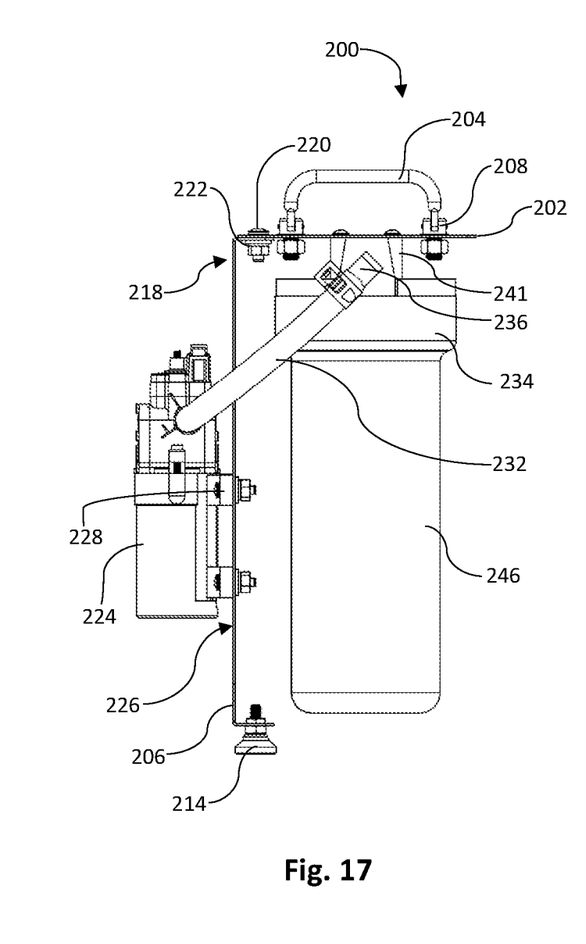
FIG. 17 is a right side elevation view of a portable water filtration apparatus.
Figure 18:
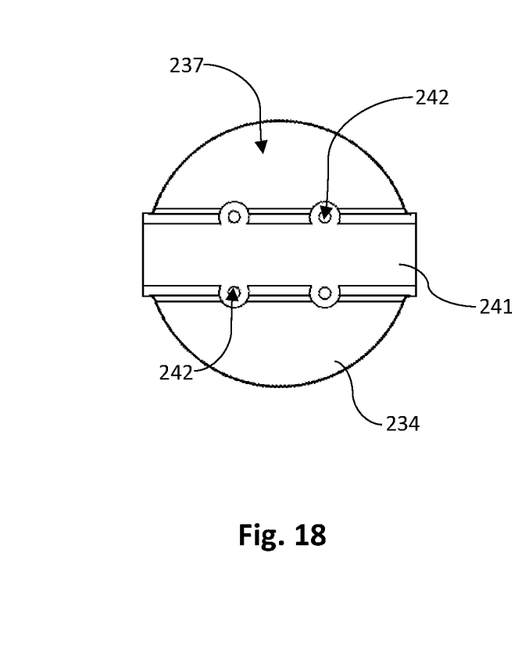
FIG. 18 is a top plan view of a filter coupler of a portable water filtration apparatus.
Figure 19:
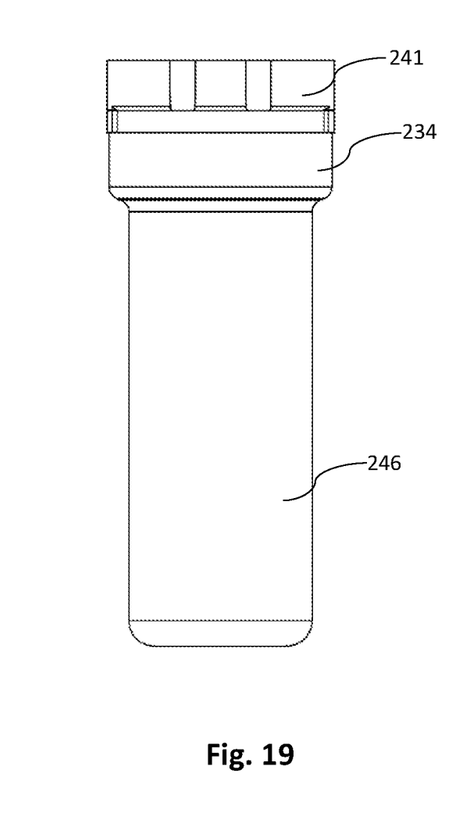
FIG. 19 is a front elevation view of a filter coupler and a filter housing of a portable water filtration apparatus.
Figure 20:
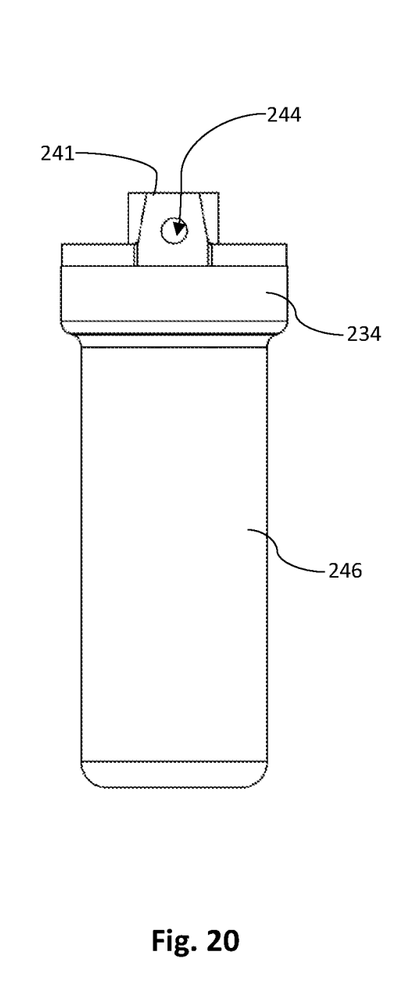
FIG. 20 is a side elevation view of a filter coupler and a filter housing of a portable water filtration apparatus.

The portable filtration apparatus 100 may be configured to be received within a housing. In other words, FIGS. 10-13 illustrate a housing 134, wherein the portable filtration apparatus 100 is sized and shaped complementary to the interior void of the housing 134 (i.e., round so as to fit inside the bucket housing 134). While a bucket housing 134 is shown, it will be appreciated that any shaped housing may be used. Accordingly, as best seen in FIGS. 11 and 13, the portable filtration apparatus 100 is received within the housing 134. The housing 134 allows for easy transportation of the portable filtration apparatus 100, but may also function as a water storage unit, either for water in need of filtering, or for water that has been filtered and is now potable. In one non-limiting example, the housing 134 is a standard five-gallon bucket known in the art. Again, because the components are off-the-shelf, the cost is reduced, making the portable water filtration apparatus and system disclosed herein inexpensive, which overcomes problems in the art.

Further, in one embodiment, the pump 108 is battery operated. This allows the portable water filtration apparatus 100 to be used when municipal, or other, electricity is not available. This motor-pumped system offers a distinct advantage by providing much higher throughput than other systems in the art that are gravity fed or hand-pumped, making the portable water filtration apparatus 100 suitable to supply the needs to a group rather than just an individual. Further, in one embodiment, the portable filtration apparatus 100 comprises at least one solar panel. The solar panel preferably charges one or more batteries, creating an energy store for actuating the pump 108. This can be extremely beneficial during times of extended outages, when electricity is not available and when standard batteries may become drained with use.

In one embodiment, as shown in FIGS. 14-17, a portable filtration apparatus 200 comprises a top panel 202 with a handle 204 coupled thereto and a mounting surface 206. The handle 204 may couple to the top panel 202 by using pivot couplers 208. It will be appreciated that, in some embodiments, the pivot couplers 208 allow the handle to pivot 180 degrees to a vertical or horizontal position (i.e., lying flat against the top panel 202), thereby allowing a user to easily transport and store the portable filtration apparatus 200. In an alternate embodiment, the pivot couplers 208 allow the handle to pivot 90 degrees. Other types of handles may be used, or a handle may not be required. The top panel 202 may further comprise top panel apertures 210 to receive, for example, screws 212 or other securement mechanisms to couple components, such as a filter coupler 234.

The mounting surface 206 comprises an adjustable leg 214 on a bottom surface 216. The adjustable leg 214 allows the portable filtration apparatus 200 to stand vertically and be self-supported. While an adjustable leg 214 is shown, it will be appreciated that, in some embodiments, the adjustable leg 214 is not required, allowing the mounting surface 206 to rest directly on the ground. The mounting surface 206 may also be extended and bent horizontally so as to create a stable surface for resting on as well. Alternatively, in some embodiments, the mounting surface 206 does not have a bottom surface 216, allowing the filter housings 246, described below, to rest directly on the ground and be self-supporting. On a top surface 218 of the mounting surface 206, the mounting surface 206 couples to the top panel 202 through the use of bolts 220 and nuts 222 (shown in FIG. 17) or other attachment accessories. In one embodiment, the mounting surface 206 and the top panel 202 may be a single unit (such as bending steel or forming plastics, etc.).

Figure 21:
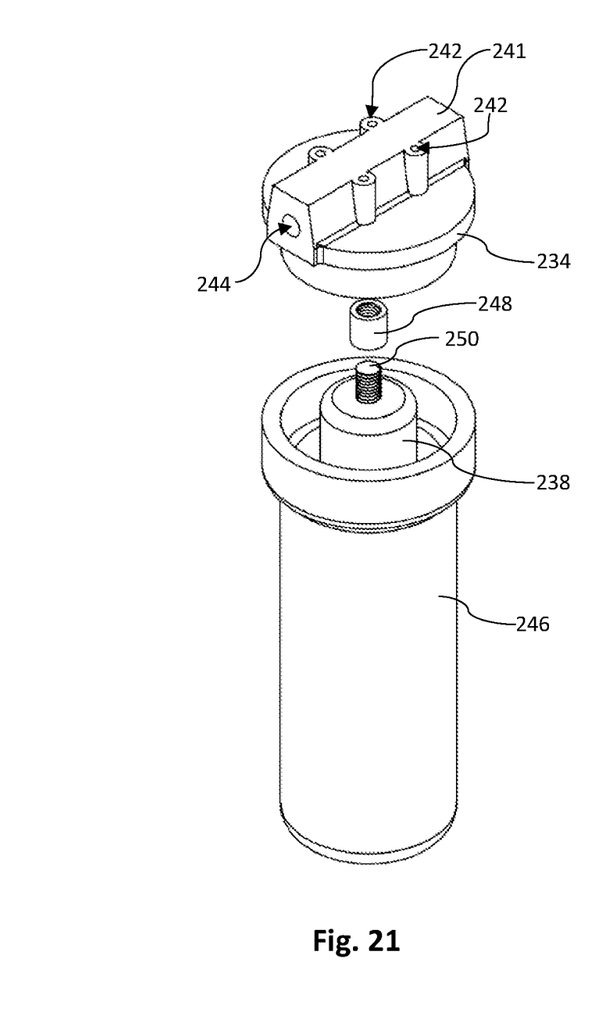
FIG. 21 is a perspective view of a filter housing with a filter coupler decoupled therefrom.

A pump 224 is mounted to the mounting surface 206 on a first, outer side 226 via bolts and nuts, screws, or any other mechanism. More specifically, the pump 224 may be mounted to the mounting surface 206 by using mounting arms 228, which can receive bolts and nuts, screws, etc. In some embodiments, the pump 224 may be a centrifugal pump, positive displacement pump, or any other type of pump. As shown, the pump 224 has an inlet 230 and an outlet 232 leading to a filter coupler 234. For example, the pump inlet 230 may comprise a hose or tube that can be placed within a water source. As the pump 224 is activated, water passes through the outlet 232 to a filter coupler inlet 236, is then filtered through one or more filters 238 (shown in FIG. 21) and then exits as potable water through a filter coupler outlet 240.

The filter couplers 234 may attach to the top panel 202 via the screws 212 or any other attachment mechanism. In particular, as shown in FIGS. 18-21, the filter couplers 234 may comprise a top surface 237 with a raised portion 241 comprising coupling apertures 242 so as to couple the filter couplers 234 to the top panel 202 by aligning the top panel apertures 210 and the coupling apertures 242 and then inserting the screws 212 (shown in FIG. 14). The raised portion 241 may also comprise outlet/inlet apertures 244 to receive the filter coupler outlet 240 and filter coupler inlet 236 (shown in FIG. 15).

Further, the one or more filters 238 may be positioned inside of a filter housing 246. The filter housings 246 may be manufactured from any type of material, such as aluminum, plastic, etc. The filter housings 246 may comprise threaded ends so as to be received by the filter couplers 234. Other types of coupling mechanisms may be used, however, such as latches with seals. In one embodiment, the one or more filters 238 comprise standard cartridge filters readily available in the art, and are easily couplable to the filter couplers 234, such as by using the filter housing 246. In some embodiments, the filters 238 may be canister filters that couple to the filter couplers 234 via a threaded sleeve 248 that couples to a threaded bolt 250 on the filter 238 and then to the filter couplers 234. It will be appreciated that the standard cartridge filters allow a user to have filters readily available for use without needing proprietary filters or other components. Other types of filters that may be used may be positioned inside the filter housing 246 but not coupled to the filter couplers as the canister filters. Another advantage is that these commercially available filters can be tailored to the specific contaminant needing removal (i.e., sediment, Volatile Organic Compounds (VOCs), biologics (bacteria, cysts), inorganics (chlorine, heavy metals), and/or dissolved solids such as calcium or magnesium.

To replace the filters 238, a user lifts the portable filtration apparatus 200 or leaves it stationary on the adjustable leg 214, allowing the filter housings 246 to be decoupled and removed from the filter couplers 234. The user may then remove and replace the filters 238 within the filter housings 246 and then re-couple (such as by using threaded ends) to the filter coupler 234. In other words, depending on the filter, the filter 238 may be coupled directly to the filter coupler 234 and then the filter housing 246 may be coupled to the filter coupler 234. Alternatively, the filter 238 may simply be placed inside of the filter housing 246 and then the filter housing 246 may be coupled to the filter couplers 234.

Figure 22:
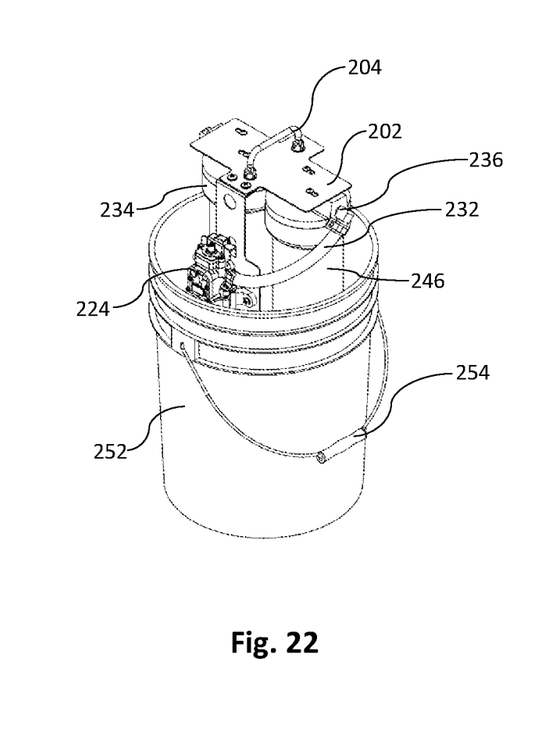
FIG. 22 is a top, side perspective view of a portable water filtration apparatus positioned partially in a housing.
Figure 23:
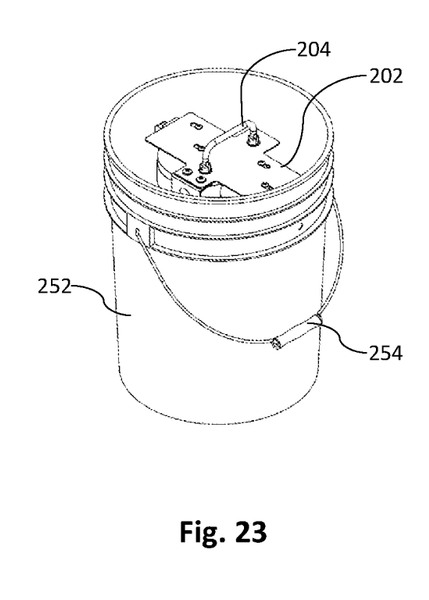
FIG. 23 is a top, side perspective view of a portable water filtration apparatus positioned in a housing.

The portable filtration apparatus 200 may be configured to be received within a housing 252. In other words, FIGS. 22-23 illustrate a housing 252, wherein the portable filtration apparatus 200 is sized to fit the interior void of the housing 252. While a bucket housing is shown, it will be appreciated that any shaped housing may be used. Accordingly, the portable filtration apparatus 200 is received within the housing 252. The housing 252 allows for easy transportation of the portable filtration apparatus 200, but may also function as a water storage unit, either for water in need of filtering, or for water that has been filtered and is now potable. Further, the housing 252 may comprise a handle 254 to further assist a user in transporting the portable filtration apparatus 200. In one non-limiting example, the housing 252 is a standard five-gallon bucket known in the art.

Further, in one embodiment, the pump 224 is battery operated. This allows the portable water filtration apparatus to be used when municipal, or other, electricity is not available. In one embodiment, the portable filtration apparatus 200 comprises at least one solar panel. The solar panel preferably charges one or more batteries, creating an energy store for actuating the pump. This can be extremely beneficial during times of extended outages, when electricity is not available and when standard batteries may become drained with use.

Figure 24:
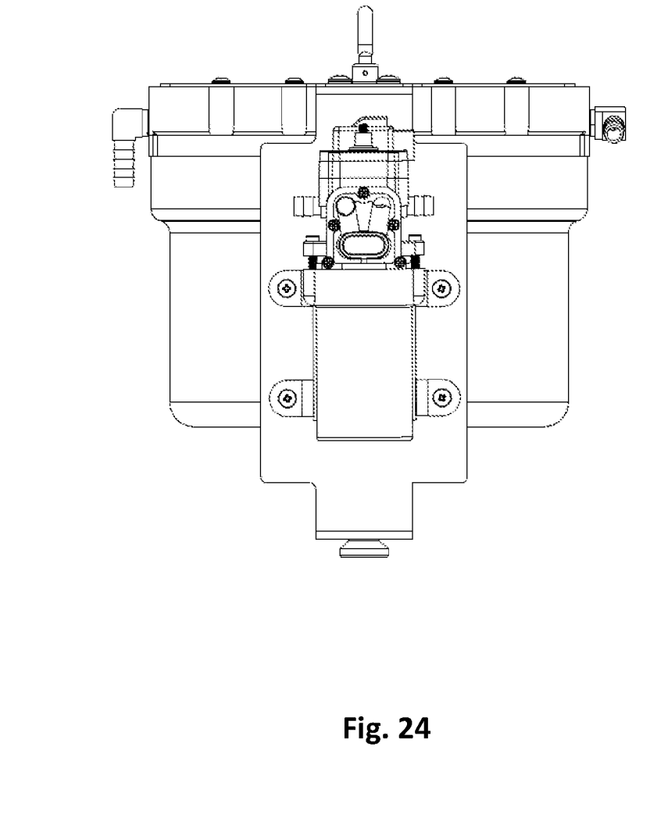
FIG. 24 is a front elevation view of a portable water filtration apparatus with a compact mounting surface and compact filter housings.
Figure 25:
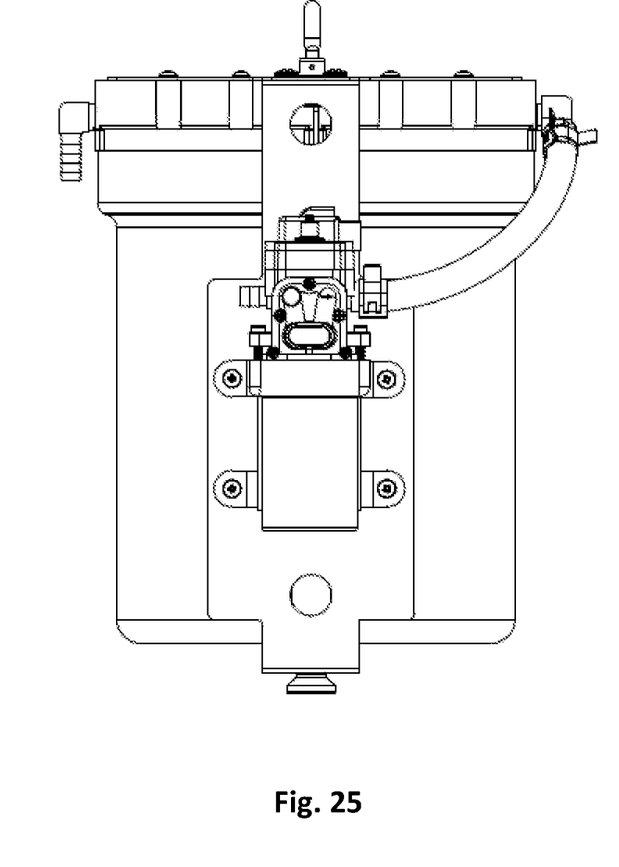
FIG. 25 is a rear elevation view of a portable water filtration apparatus with an extended mounting surface and extended filter housings.

FIG. 24 illustrates a portable filtration apparatus with a compact or shortened mounting surface and filter housings, allowing for smaller storage and transport. For example, the filter housings may be five inches tall. FIG. 25 illustrates a portable filtration apparatus with an extended mounting surface and extended filter housings, allowing for larger filters, such as 10-inch tall. Accordingly, it will be appreciated that the portable filtration apparatus may come in a variety of sizes to fit any user's needs.

As appreciated from the foregoing, the portable water filtration apparatus disclosed herein solves the need for a portable water filtration system that is inexpensive, effective, compact, that uses readily accessible filters and accessories, and that can be powered by batteries or solar power. Further, because of the electric motor, the throughput is greater, which aids in supplying demand for clean, potable water. Lastly, because it may be battery and/or solar operated, the present invention solves the need for potable water during extended power outages when potable water sources are not readily available.

It will also be appreciated that apparatuses according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A portable water filtration apparatus, comprising:
a top panel;
a mounting surface extending vertically downward from the top panel;
an electric pump mounted on the mounting surface;
one or more filter couplers coupleable to the top panel;
one or more filters housings coupleable to the one or more filter couplers, the one or more filter housings comprising one or more filters; and
an adjustable leg coupled to a bottom surface of the mounting surface.

2. The portable water filtration apparatus of claim 1, further comprising a housing, the top panel, mounting surface, and filter housings sized and configured to be received within the housing.

3. The portable water filtration apparatus of claim 1, further comprising a handle coupled to the top panel using pivot couplers, the pivot couplers allowing the handle to pivot 90 degrees so as to lay flat on the top panel.

4. The portable water filtration apparatus of claim 1, wherein the one or more filter housings comprise threaded ends to couple to the one or more filter couplers.

5. A portable water filtration apparatus, comprising:
a top panel with a handle, the handle coupleable to the top panel via pivot couplers;
a mounting surface coupled to the top panel and extending vertically downward therefrom to a bottom surface, the bottom surface comprising an adjustable leg;
a pump mounted on the mounting surface via mounting arms, the pump comprising an inlet and an outlet;
one or more filter couplers coupled to the top panel;
one or more filters positioned in one or more filter housings, the one or more filter housings coupled to the filter couplers;
the pump outlet being coupled to a filter coupler inlet, wherein when water passes through the pump outlet to the filter coupler inlet to the one or more filter couplers, the water is filtered through the one or more filters, where it then exits through a filter coupler outlet.

6. The portable water filtration apparatus of claim 5, further comprising a housing, the top panel, mounting surface, and filter housings sized and configured to be received within the housing.

7. The portable water filtration apparatus of claim 6, wherein the housing is a 5-gallon bucket.

8. The portable water filtration apparatus of claim 5, further comprising a handle coupled to the top panel using pivot couplers, the pivot couplers allowing the handle to pivot 90 degrees so as to lay flat on the top panel.

9. The portable water filtration apparatus of claim 5, wherein the one or more filter housings comprise threaded ends to couple to the one or more filter couplers.

10. A portable water filtration apparatus, comprising:
a top panel;
a mounting surface extending vertically downward from the top panel to a bottom end and being of sufficient length to contact the ground, wherein the bottom end of the mounting surface is not bent horizontally;
an electric pump mounted on the mounting surface;
one or more filter couplers coupleable to the top panel; and one or more filters housings coupleable to the one or more filter couplers, the one or more filter housings comprising one or more filters.

11. A portable water filtration apparatus, comprising:
a top panel;
a mounting surface extending vertically downward from the top panel to a bottom end and being of sufficient length to contact the ground, wherein the bottom end is bent horizontally;
an electric pump mounted on the mounting surface;
one or more filter couplers coupleable to the top panel; and
one or more filters housings coupleable to the one or more filter couplers, the one or more filter housings comprising one or more filters, wherein the bottom end of the mounting surface that is bent horizontally does not extend under bottom ends of the one or more filter housings.

\* \* \* \* \*